United States Patent
Kusche et al.

(10) Patent No.: US 10,589,247 B2
(45) Date of Patent: Mar. 17, 2020

(54) REACTOR APPARATUS FOR LOADING A CARRIER MEDIUM WITH HYDROGEN AND/OR UNLOADING IT THEREFROM AND PLANT COMPRISING A REACTOR APPARATUS OF THIS KIND

(71) Applicant: HYDROGENIOUS TECHNOLOGIES GmbH, Erlangen (DE)

(72) Inventors: Matthias Kusche, Schwaig (DE); Berthold Melcher, Erlangen (DE); Daniel Teichmann, München (DE)

(73) Assignee: HYDROGENIOUS LOHC TECHNOLOGIES GMBH, Erlangen (DE)

(*) Notice: Subject to any disclaimer, the term of this patent is extended or adjusted under 35 U.S.C. 154(b) by 0 days.

(21) Appl. No.: 15/766,120

(22) PCT Filed: Oct. 6, 2016

(86) PCT No.: PCT/EP2016/073897
§ 371 (c)(1),
(2) Date: Apr. 5, 2018

(87) PCT Pub. No.: WO2017/060362
PCT Pub. Date: Apr. 13, 2017

(65) Prior Publication Data
US 2018/0290116 A1    Oct. 11, 2018

(30) Foreign Application Priority Data

Oct. 6, 2015 (DE) .......... 10 2015 219 306

(51) Int. Cl.
| | |
|---|---|
| *B01J 8/00* | (2006.01) |
| *B01J 8/18* | (2006.01) |
| *B01J 8/20* | (2006.01) |
| *B01J 8/22* | (2006.01) |
| *B01J 19/00* | (2006.01) |

(Continued)

(52) U.S. Cl.
CPC ............. *B01J 8/22* (2013.01); *C01B 3/0015* (2013.01); *B01J 2208/00123* (2013.01);
(Continued)

(58) Field of Classification Search
CPC ......... B01J 8/00; B01J 8/18; B01J 8/20; B01J 8/22; B01J 19/00; B01J 19/24;
(Continued)

(56) References Cited

U.S. PATENT DOCUMENTS

| | | | |
|---|---|---|---|
| 2,518,583 A | 8/1950 | Watson | |
| 2,539,415 A | 1/1951 | Garbo | |

(Continued)

FOREIGN PATENT DOCUMENTS

| | | |
|---|---|---|
| DE | 34 39 175 A1 | 5/1986 |
| DE | 10 2008 023 042 A1 | 11/2009 |

(Continued)

OTHER PUBLICATIONS

Machine translation of DE 102010038491 A1, which was published on Feb. 2, 2012. (Year: 2012).*

*Primary Examiner* — Natasha E Young
(74) *Attorney, Agent, or Firm* — McGlew and Tuttle, P.C.

(57) ABSTRACT

A reactor apparatus for loading a carrier medium with hydrogen and/or unloading it therefrom includes a reactor housing chargeable with carrier medium and having a carrier medium feed orifice, having a carrier medium removal orifice, having a base and having a hydrogen gas orifice. The reactor apparatus further includes at least one heat transfer element for supplying heat into the reactor housing. Catalyst has been provided in the reactor housing.

21 Claims, 2 Drawing Sheets

(51) Int. Cl.
*B01J 19/24* (2006.01)
*C01B 3/00* (2006.01)

(52) U.S. Cl.
CPC .............. *B01J 2208/00132* (2013.01); *B01J 2208/00141* (2013.01); *B01J 2208/00221* (2013.01); *B01J 2219/185* (2013.01); *Y02E 60/328* (2013.01); *Y02E 60/366* (2013.01)

(58) Field of Classification Search
CPC ....... B01J 2208/00–00017; B01J 2208/00106; B01J 2208/00115; B01J 2208/00123; B01J 2208/0132; B01J 2208/00141; B01J 2208/00168; B01J 2208/00212; B01J 2208/00221; B01J 2219/18; B01J 2219/185; C01B 3/00–0015; Y02E 60/00; Y02E 60/30; Y02E 60/32; Y02E 60/324; Y02E 60/328; Y02E 60/36; Y02E 60/366
See application file for complete search history.

(56) References Cited

U.S. PATENT DOCUMENTS

| 2010/0093877 A1 | 4/2010 | Espinoza |
| 2012/0164034 A1 | 6/2012 | Seo et al. |

FOREIGN PATENT DOCUMENTS

| DE | 102010038491 A1 * | 2/2012 | ............... C01B 3/26 |
| EP | 0 157 463 A2 | 10/1985 | |
| EP | 1 475 349 A2 | 11/2004 | |
| EP | 2 742 994 A1 | 6/2014 | |
| WO | 2004/047980 A1 | 6/2004 | |
| WO | 2004/088227 A2 | 10/2004 | |
| WO | 2006/097906 A1 | 9/2006 | |
| WO | 2009/135942 A1 | 11/2009 | |
| WO | 2015/087211 A1 | 6/2015 | |

* cited by examiner

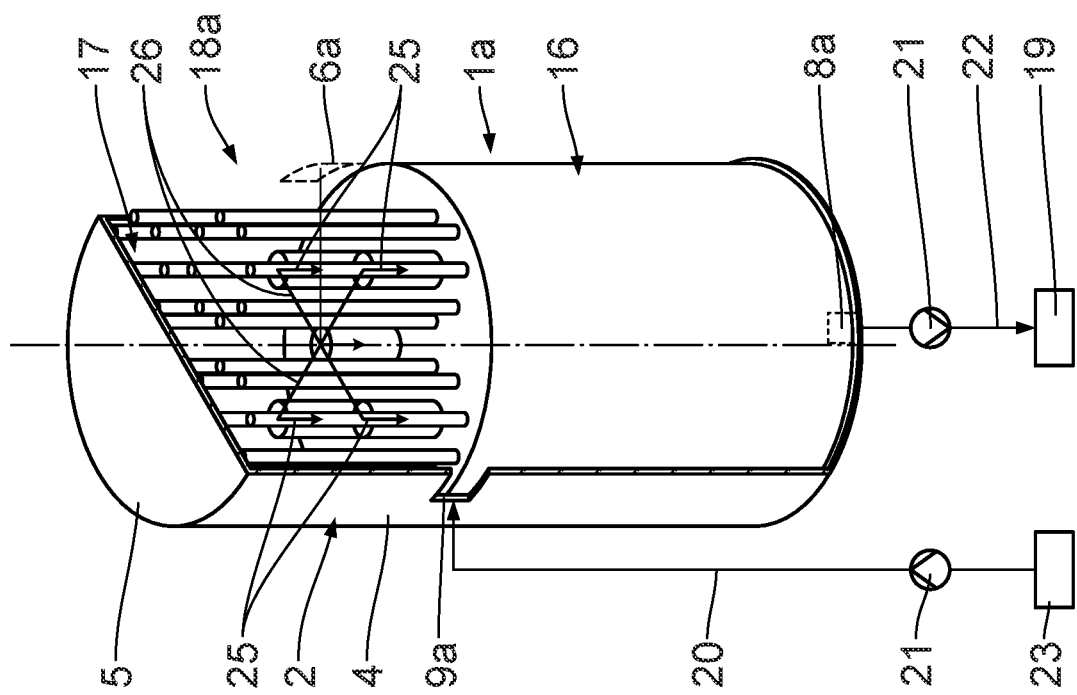
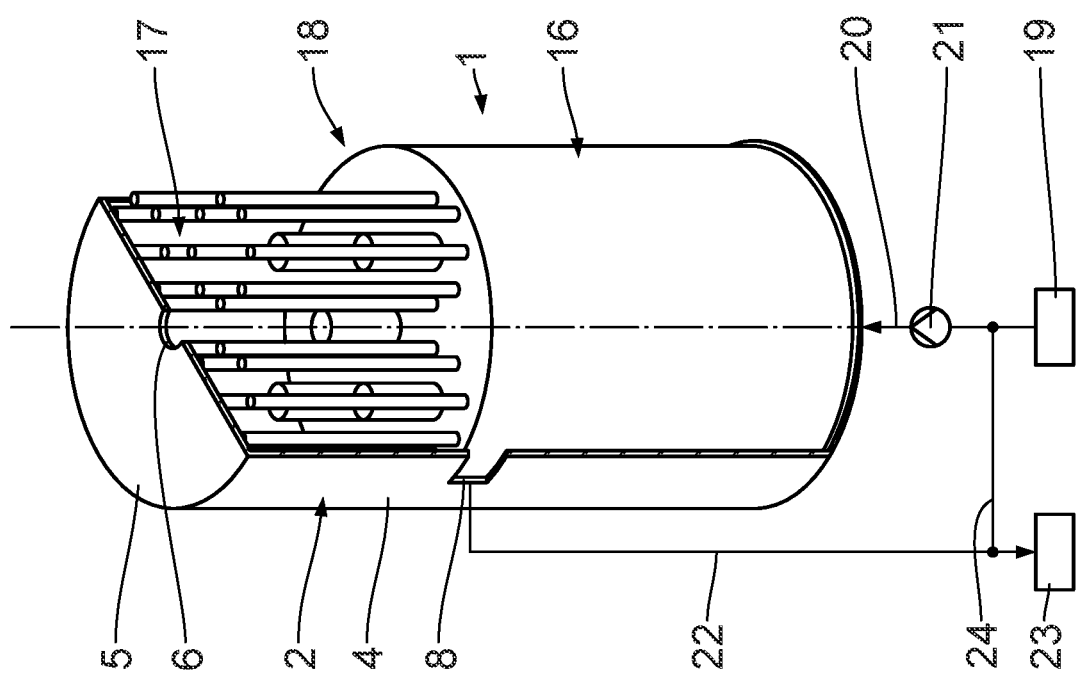
Fig. 4
Fig. 3

US 10,589,247 B2

REACTOR APPARATUS FOR LOADING A CARRIER MEDIUM WITH HYDROGEN AND/OR UNLOADING IT THEREFROM AND PLANT COMPRISING A REACTOR APPARATUS OF THIS KIND

CROSS REFERENCE TO RELATED APPLICATIONS

This application is a United States National Phase Application of International Application PCT/EP2016/073897, WO/2017/060362, filed Oct. 6, 2016 and claims the benefit of priority under 35 U.S.C. § 119 of German patent application Serial No. DE 10 2015 219 306.3 filed on Oct. 6, 2015, the entire contents of which are incorporated herein by reference.

FIELD OF THE INVENTION

The invention relates to a reactor apparatus for loading a carrier medium with hydrogen and/or unloading it therefrom and a plant comprising a reactor apparatus of this kind.

BACKGROUND OF THE INVENTION

In reactors for loading a carrier medium with hydrogen and/or unloading it therefrom, firstly adequate heat transfer from or to a catalyst and also very substantially unhindered release of hydrogen gas separated from the carrier medium requires. These boundary conditions result in sometimes contradictory demands on a reactor apparatus.

SUMMARY OF THE INVENTION

It is the object of the invention to improve a reactor apparatus in such a way that the reactor apparatus has an uncomplicated design and, more particularly, the loading of a carrier medium with hydrogen and/or the unloading of it therefrom is improved and, more particularly, the charging with and removal of catalyst takes place in a simple manner.

This object is achieved by a reactor apparatus for loading a carrier medium with hydrogen and/or unloading it therefrom, wherein the reactor apparatus comprises a reactor housing chargeable with carrier medium and having a carrier medium feed orifice, a carrier medium removal orifice, a base, a hydrogen gas orifice, and at least one heat transfer element for supplying heat into the reactor housing. Furthermore, this object is achieved by a plant for loading a carrier medium with hydrogen and/or unloading it therefrom, comprising a reactor apparatus according to the invention, a first storage means which is connected to the reactor apparatus and is for storing hydrogen-laden carrier medium, a second storage means which is connected to the reactor apparatus and is for storing carrier medium that has been separated from hydrogen, and a hydrogen gas supply connected to the reactor apparatus. The core of the invention is that a reactor housing provides a particularly large volume for a catalyst. The reaction space of the reactor apparatus has been increased. More particularly, there exists a single, large reaction space, which means that the reaction, i.e. the loading of the carrier medium with hydrogen and/or the unloading of it therefrom is facilitated. The reactor housing is especially charged with catalyst which is surrounded by the carrier medium, especially by flowing carrier medium. The reactor apparatus is fundamentally suitable for loading a carrier medium with hydrogen and/or unloading it therefrom. The reactor apparatus of the invention differs from typical shell and tube reactors essentially on the basis of the number and size of the reaction spaces. The reactor housing provides a comparatively large catalyst volume. Owing to the elevated catalyst volume, based on the reactor volume, a rise in the volume-specific output, i.e. the hydrogenation or dehydrogenation rate, is possible. More particularly, it is unnecessary for better heat transfer to arrange the catalyst in a single tube or a multitude of single tubes. Improved heat transfer is especially achieved in that at least one heat transfer element is immersed in a mixture of catalyst and carrier medium. It may be advantageous for multiple heat transfer elements to be provided. It may additionally be advantageous when the at least one hydrogen gas duct is arranged adjacent to the heat transfer element. Especially where heat is introduced into the catalyst via the at least one heat transfer element, there is primarily release of hydrogen gas in the unloading of the carrier medium. The removal of the hydrogen gas released is promoted by an adjacent hydrogen gas duct. The heat can be transferred directly from the at least one heat transfer element to the carrier medium and into the catalyst. The reactor apparatus is especially suitable as dehydrogenation reactor for uploading hydrogen from the carrier medium. However, the reactor apparatus can especially also be utilized directly as a hydrogenation reactor in order to load carrier medium with hydrogen gas. More particularly, utilization of the reactor apparatus for loading and unloading is possible in different modes of operation. The reactor apparatus can thus be utilized both as a hydrogenation reactor and as a dehydrogenation reactor. It is possible to provide multiple hydrogen gas ducts in the reactor housing. This can increase the reactor output. The reactor apparatus may be set and/or arranged in a defined manner with the base upon a ground. This means that the reactor housing may be set directly upon the base. This also means that a frame may be provided, on which the reactor apparatus may be disposed by the base of the reactor housing. Another conceivable method is suspension of the reactor apparatus on suitable elements, for example from a roof. In this case, the base of the reactor housing is floating in the air. In this case, however, the base is executed essentially parallel to a ground. The reactor housing is chargeable with a carrier medium. Hydrogen may be chemically bound to the carrier medium. The carrier medium is liquid. A carrier medium of this kind is known, for example, as liquid organic hydrogen carrier (LOHC). LOHC is an organic hydrogen storage liquid in the form of a cyclic hydrocarbon. The reactor housing has a carrier medium feed orifice and a carrier medium removal orifice. Also provided is a hydrogen gas orifice, by means of which hydrogen gas can be supplied for loading and removed for unloading. By means of at least one heat transfer element, the heat required for an unloading reaction can be supplied directly to the catalyst. The construction of the reactor apparatus is uncomplicated and simplified. The heat is supplied directly and with reduced energy losses.

A reactor apparatus having at least one hydrogen gas duct disposed in the reactor housing enables improved supply or removal of hydrogen gas from the reactor housing. The at least one hydrogen gas duct is especially secured to the base and extends vertically along a longitudinal axis at least in part and/or at least in sections. The hydrogen gas duct may also be arranged spaced apart from the base. It is essential that the hydrogen gas duct is arranged within the reactor housing in such a way that a lower end of the hydrogen gas duct dips into the catalyst bed. The at least one hydrogen gas duct is especially oriented perpendicularly to the base. The hydrogen gas duct may also be arranged in an inclined or curved manner with respect to a longitudinal axis of the reactor housing. It is essential that the hydrogen gas duct is executed vertically at least in sections and/or at least in parts, such that, for example, unloaded hydrogen gas can escape of its own accord via the hydrogen gas duct. When the base is oriented horizontally, the longitudinal axis of the at least one hydrogen gas duct is especially oriented vertically. Owing to the vertical arrangement of the hydrogen gas duct at least in parts and at least in sections, hydrogen gas collected therein can especially escape of its own accord owing to its comparatively low density. The hydrogen gas duct makes it easier for the hydrogen gas formed in the unloading to flow away. Sufficient volume is made available for the hydrogen gas to flow away. The catalyst does not hinder the flow-away of the hydrogen gas. More particularly, a suction effect develops in such a way that hydrogen gas bubbles into the hydrogen gas duct, where there is reduced flow resistance. The hydrogen gas pulls surrounding hydrogen gas particles with it and brings about preferential flow-away through the hydrogen gas duct. It is also conceivable in principle that hydrogen gas forms of its own accord in the mixture of catalyst and carrier medium and ascends out of the catalyst bed owing to the reduced density, i.e. outside the hydrogen gas ducts.

A reactor apparatus having multiple heat transfer elements enables improved heat transfer. The heat transfer elements are specially each arranged at equal distances from the hydrogen gas duct. More particularly, the heat transfer elements are arranged along a circular line around the hydrogen gas duct. The arrangement of the heat transfer elements in the reactor housing is especially configured in such a way that effective and homogeneous heating of the catalyst bed is possible. The heat transfer elements can also be arranged irregularly and at different distances from one another in the reactor housing. More particularly, the heat transfer elements and the hydrogen gas duct are arranged parallel to one another.

Especially in the case of suitable arrangement of the hydrogen gas duct in the reactor housing, it is possible that heat transfer elements arranged especially in the form of rods within the reactor housing are assigned to at least two hydrogen gas ducts. It is also possible that the heat transfer elements are executed not as linear elements in rod form. It is conceivable that a heat transfer element is executed in the form of a helix, i.e. in the form of a helical line. It is also conceivable that a heat transfer element is executed in spiral form. It is also conceivable to arrange differently shaped heat transfer elements within the reactor housing. It is also conceivable that a heat transfer element has been equipped with fins, a coating or a rough surface. This ensures an effective mode of operation of the reactor apparatus. The complexity involved in the heat transfer is reduced.

In a reactor apparatus in which the reactor housing has been filled with a mixture of carrier medium and catalyst, effective hydrogenation or dehydrogenation is possible. The mixture may also comprise further constituents. The catalyst used, depending on the reaction to be conducted, is, for example, ruthenium, platinum or palladium. The catalyst material has been applied to a support material. The support material used is especially alumina. Typical catalyst materials are known, for example, from EP 1 475 349 A2, these being suitable as carrier medium for LOHCs in particular.

The catalyst has especially been provided in the form of a bed on the base of the reactor housing. Owing to the comparatively high charge level, there is an improvement in the reaction rate. The proportion by volume of the carrier medium in the reactor housing that comes into contact with the catalyst is comparatively high. The volume of the mixture within the reactor housing is at least half the volume of the reactor housing, especially at least 60% and especially ⅔. The volume of the mixture may also be less than 60%. The volume of the mixture may also be more than ⅔ of the reactor housing volume. It is advantageous when a sufficiently large residual volume remains unoccupied, such that unloaded hydrogen gas can collect in an upper region of the reactor housing and can flow away via the hydrogen gas orifice.

A reactor apparatus in which a first end of the at least one hydrogen gas duct is disposed outside the mixture enables unhindered escape of gas released in the dehydrogenation. At the same time, uncomplicated introduction of hydrogen gas for the hydrogenation is simplified. The first end is especially remote from the base. The first end is a free end.

A reactor apparatus in which the at least one hydrogen gas duct has a length less than a length of the reactor housing enables advantageous management and operation of the reactor apparatus.

A reactor apparatus in which there is a through-flow section at a second end of the at least one hydrogen gas duct enables fluid flow between the reactor housing and the hydrogen gas duct. This means that medium from the reactor housing, especially the mixture of catalyst and carrier medium, may be disposed within the hydrogen gas duct. Hydrogen removed during a dehydrogenation in the mixture can escape unhindered through the hydrogen gas duct and leave the hydrogen gas duct especially at the first end. The through-flow section is especially executed in such a way that it is permeable in the radial direction, based on the longitudinal axis of the at least one hydrogen gas duct. This radial permeability may be executed, for example, by means of a mesh or grid structure of the hydrogen gas duct. It is also conceivable that the hydrogen gas duct is executed as a hose or tube and has transverse bores, slots or especially a perforation in the region of the through-flow section. The through-flow section may also be executed by means of a porous material or by means of a sieve structure. The through-flow section especially extends along the longitudinal axis of the hydrogen gas duct, where the length of the through-flow section is especially less than the length of the hydrogen gas duct. The through-flow section may alternatively extend over the entire length of the hydrogen gas duct.

A reactor apparatus executed as a dehydrogenation reactor enables improved gas output of the hydrogen gas removed coupled with improved heat transfer.

A reactor apparatus having a gas collecting space disposed in the reactor housing ensures that the hydrogen gas removed can be collected in a defined manner. In the gas collecting space disposed within the reactor housing, especially above the first ends of the hydrogen gas ducts, controlled calming of the hydrogen gas removed takes place. The gas collecting space is a gas calming space. The gas collecting space is connected to the hydrogen gas orifice and the at least one hydrogen gas duct. The hydrogen collected in the gas collecting space can be removed via the hydrogen gas duct.

In a reactor apparatus in which the carrier medium outlet orifice is disposed in a side wall of the reactor housing, the carrier medium can be removed in an uncomplicated manner and especially directly from the reactor housing. More particularly, the arrangement of the carrier medium removal orifice in the side wall, especially the vertical distance of the carrier medium removal orifice from the base, is crucial for a maximum charge level within the reactor housing. This ensures integrated and uncomplicated charge level limitation in the reactor housing.

A reactor apparatus with a separation element disposed in the reactor housing ensures that carrier medium particles entrained with the hydrogen gas removed can be reliably separated out and can drip off as droplets directly into the mixture in the reactor housing. More particularly, it is not necessary that carrier medium particles entrained with the hydrogen gas have to be fed back again via a circulation conduit. The entrained carrier medium particles are separated out still within the reactor housing and are automatically returned again to the carrier medium. The separating-out and recycling of the carrier medium is uncomplicated and direct, and simplified as a result.

A reactor apparatus in which the separation element comprises a droplet separator and/or a condenser enables particularly advantageous separation of entrained carrier medium particles. The condenser especially serves for condensing when the entrained carrier medium has been in vaporous form. The vaporous carrier medium can condense at the condenser and drip off in the form of liquid carrier medium. It is conceivable that it is sufficient for the condensation function for the reactor housing to be thermally uninsulated in an upper region, especially in the region of the lid. In this case, the thermally uninsulated lid is a condenser. By means of active cooling in the form of a pipe coil or a condenser, it would especially be possible to condense out carrier medium which is gaseous, because it has vaporized, especially LOHC, and to return it directly to the mixture in the reactor housing. The quality of the hydrogen gas removed is elevated. The rate of loss of the carrier medium is reduced. Unconverted carrier medium can take part again in an unloading reaction. What is especially prevented is that unconverted carrier medium is removed unintentionally from the reactor housing. Complex recycling of unconverted carrier medium can be dispensed with. The droplet separator serves especially for separation of entrained carrier medium in droplet form. The droplet separator can be executed as a lamellar plate or as a baffle plate, and especially be disposed in the region of the end of the hydrogen gas duct remote from the base. This improves preliminary separation of liquid droplets out of the hydrogen stream.

An additional improvement in the separation of the entrained carrier medium particles out of the hydrogen gas is possible in that the hydrogen gas is deflected at least once, especially more than once, in its flow direction before it leaves the reactor housing. For this purpose, a flow deflection element may be disposed in the region of the hydrogen gas orifice within the reactor housing. For example, the flow-redirecting element is a meandering pipe section connected to the hydrogen gas orifice. By means of the flow-redirecting element, the flow of the hydrogen gas stream is redirected repeatedly. Owing to the inertia of the liquid droplets, they are separated out of the gas stream. An additional increase in the degree of separation can be effected by means of a barrier element in the form of a close-mesh wire knit which is especially arranged transverse or perpendicularly to the flow direction of the hydrogen gas. The wire knit is especially designed such that it offers virtually no flow resistance, if any, to the hydrogen gas.

The close-mesh wire knit is especially arranged in the downstream space and enables automatic dripping-off into the carrier medium disposed in the base region of the downstream space.

A reactor apparatus designed as a hydrogenation reactor enables sufficient removal of the excess of heat that occurs during the exothermic hydrogenation.

A reactor apparatus having at least one gas inlet nozzle assures effective and direct supply of hydrogen gas required for the hydrogenation, i.e. for the loading of the carrier medium with hydrogen gas. More particularly, each hydrogen gas duct is assigned at least one gas inlet nozzle, and each hydrogen gas duct is especially assigned exactly one gas inlet nozzle. Hydrogen gas is fed directly into the hydrogen gas duct via the gas inlet nozzle and thence via the carrier medium stored in the hydrogen gas duct to the catalyst.

A reactor apparatus in which the at least one gas inlet nozzle is disposed at a first end of the at least one hydrogen gas duct simplifies direct introduction of the hydrogen gas. The first end is especially remote from the base.

A plant for loading a carrier medium with hydrogen and unloading it therefrom comprises, as well as the reactor apparatus of the invention, a first utilizer connected to the reaction apparatus. The first utilizer serves to store hydrogen-laden carrier medium. The plant comprises a second utilizer connected to the reactor apparatus. The second utilizer serves to store carrier medium separated from hydrogen, i.e. unloaded carrier medium.

The plant further comprises a hydrogen gas supply connected to the reactor apparatus. The hydrogen gas supply may, for example, be a hydrogen gas source in order to supply hydrogen gas for a desired hydrogenation reaction. The hydrogen source is especially a plant that serves to generate hydrogen gas. This is especially effected by electrolysis of water, for which the electrical power required is preferably obtained from renewable forms of energy, especially by means of photovoltaic plants and/or wind power plants. Alternatively, the hydrogen gas source used may especially be an electrical power grid for operation of the electrolysis, especially during a period of high energy availability. A period of high energy availability exists when there is a surplus of energy and energy is available comparatively inexpensively. The hydrogen gas supply may, for example, also be a hydrogen gas sink or a hydrogen gas consumer. The hydrogen gas consumer serves for utilization of the hydrogen gas. This is especially a fuel cell by means of which the hydrogen gas can be converted to power, i.e. to electrical power. The utilization of the hydrogen gas, i.e. the conversion of the energy carrier to electrical energy, is especially effected during a period of low energy availability, i.e. when renewable forms of energy for generation of electrical energy are not utilizable or electrical energy would have to be purchased at comparatively high cost from the public grid.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a diagrammatic view, corresponding to FIG. 1, of the reactor apparatus charged with a mixture and further components of a plant for discharging hydrogen from a carrier medium; and FIG. 4 is a diagrammatic view, corresponding to FIG. 3, of a further plant with a reactor apparatus in a second embodiment.

DESCRIPTION OF THE PREFERRED EMBODIMENTS

Figure 2:
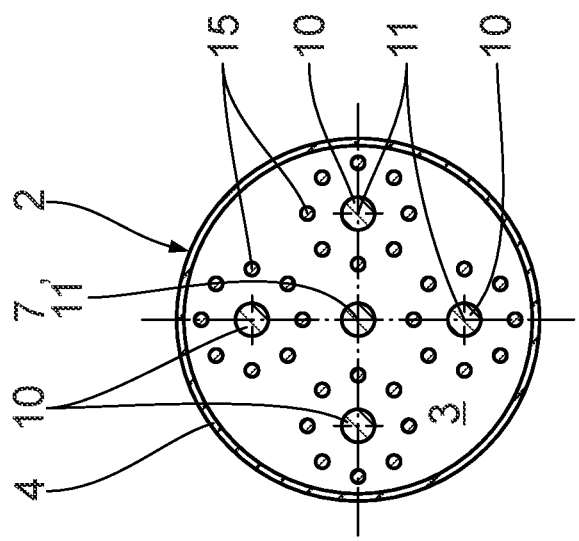
FIG. 2 is a cross sectional view along section line II-II in FIG. 1.
Figure 1:
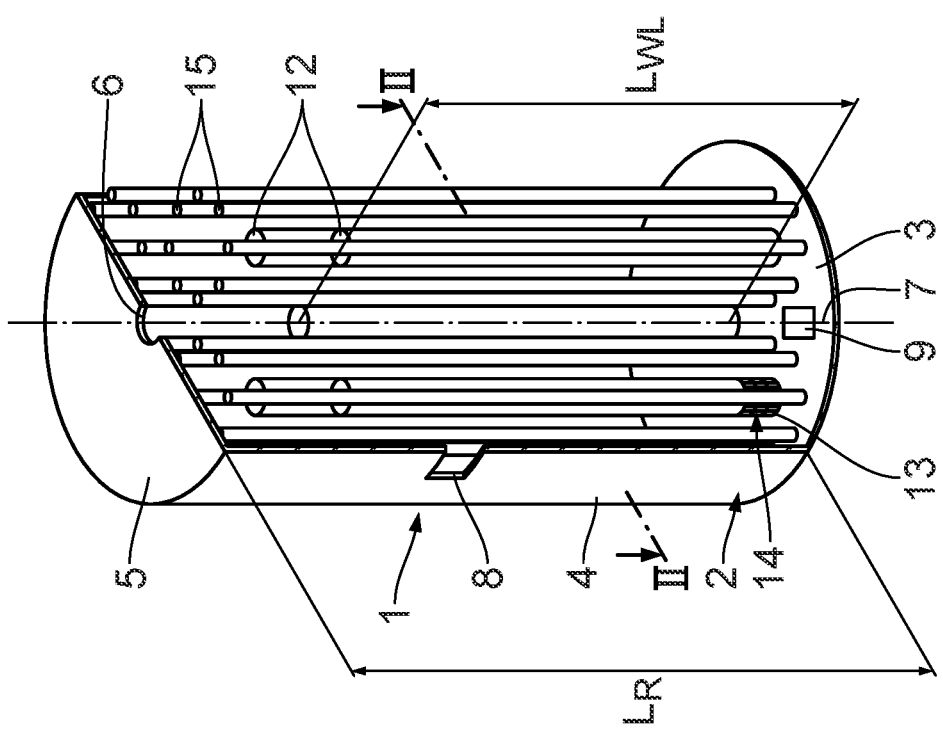
FIG. 1 is a perspective view of a reactor apparatus in partial cross section according to a first embodiment.

A reactor apparatus shown in FIGS. 1 to 3 serves for dehydrogenation of LOHC, i.e. for removal of hydrogen gas from LOHC as carrier medium. A reaction of this kind is referred to as discharging hydrogen from the carrier medium. The reaction is a dehydrogenation reaction.

The reactor apparatus 1 has a reactor housing 2. The reactor housing 2, in the working example shown, takes the form of a closed hollow cylinder having a base 3 in the form of a circular disk, a cylindrical outer wall 4 and a lid 5 in the form of a circular disk. The base 3 and the lid 5 are essentially identical. The base 3, the side wall 4 and the lid 5 are bonded directly to one another in pairs in each case, especially bonded to one another in a releasable manner, especially screwed to one another. The reactor housing 2 encloses an inner space with sealing. The catalyst has been introduced as a loose bed within the reactor housing 2. The catalyst is surrounded by the carrier medium. In order to prevent uncontrolled flow of the catalyst with the reactor medium within the reactor housing 2, the catalyst may be retained with a fixing element, for example a mesh arranged above it. The bed height of the catalyst extends essentially up to a carrier medium removal orifice 8. A hydrogen gas orifice 6 is provided at the lid 5. In the working example shown, exactly one hydrogen gas orifice 6 is provided, arranged centrally in the lid 5. It is also possible for multiple hydrogen gas orifices 6 to be provided.

More particularly, the reactor housing 2 may have a different outline. More particularly, an outline of the reactor housing perpendicular to the longitudinal reactor housing axis 7 may, for example, have a rectangular, triangular, pentagonal, hexagonal or oval design. Other, especially unsymmetrical, reactor housing outlines are also conceivable.

A carrier medium removal orifice 8 is provided in the side wall 4. A carrier medium feed orifice 9 is provided in the base 3. The carrier medium feed orifice 9 may also be provided in the side wall 4 in order, for example, to set the reactor housing 2 by the base 3 directly onto a ground. The carrier medium removal orifice 8 serves for removal of unloaded carrier medium. The carrier medium feed orifice 9 serves to feed laden carrier medium to the reactor housing.

There are multiple hydrogen gas ducts 10 disposed in the reactor housing, five in the working example shown. The hydrogen gas ducts 10 are hollow cylindrical steel tubes secured to the base 3 of the reactor housing 2. The hydrogen gas ducts 10 may also have been manufactured from another material. The hydrogen gas ducts 10 may have a cross-sectional shape which, for example, is not round and may have, for example, a triangular, quadrangular, especially rectangular, square, hexagonal or another shape. It is also possible that the hydrogen gas ducts are arranged spaced apart from the base 3. In this case, the hydrogen gas ducts 10 may be held within the reactor housing 2 by means of a holding apparatus. The holding apparatus is especially arranged in such a way that it is arranged outside the catalyst bed in order not to hinder the formation of hydrogen gas.

The hydrogen gas ducts 10 are arranged in a regular, cruciate pattern in the base 3 of the reactor housing 2. One hydrogen gas duct 10 is arranged concentrically to the circular base 3 and especially concentrically to the longitudinal reactor housing axis 7. The other hydrogen gas ducts are each secured with equal spacing from the central hydrogen gas duct 10 to the base 3.

The hydrogen gas ducts 10 have a circular ring cross section. The hydrogen conduits are each identical. The hydrogen conduits 10 have a length $L_{WL}$ less than a length of the reactor housing $L_R$ along the longitudinal reactor housing axis 7. In particular: $L_{WL} \leq 0.95 \times L_R$, especially $L_{WL} \leq 0.9 \times L_R$, especially $L_{WL} \leq 0.8 \times L_R$ and especially $L_{WL} \leq 0.75 \times L_R$.

Each hydrogen gas duct 10 has a longitudinal axis 11. The longitudinal axes 11 of the hydrogen conduits 10 are each parallel to one another in pairs. The longitudinal axis 11 are especially parallel to the longitudinal reactor housing axis 7.

The upper end 12 of the hydrogen gas ducts 10 facing the lid 5 is a free end. The first end 12 is remote from the base 3. A second end 13 of the hydrogen gas duct 10 at the opposite end from the first end 12 faces the base 3. More particularly, the hydrogen gas duct 10 is secured to the second end 13 at the base 3. In the region of the second end 13, the hydrogen gas ducts 10 each have a through-flow section 14, which, according to the working example shown in FIG. 1, is executed as a mesh structure. For this purpose, a metal mesh may be disposed at a lower end of a tube section. It is essential that the through-flow section 14 enables fluid flow from the interior of the reactor housing 2 into the at least one hydrogen gas duct 10. The through-flow section 14 may extend over the entire length of the hydrogen gas duct 10. This promotes the removal of the hydrogen gas.

Eight heat transfer elements 15 in each case are assigned to the four hydrogen gas ducts 10 that are each arranged eccentrically to the longitudinal reactor housing axis 7. The heat transfer elements 15 are executed as heat transfer tubes that extend essentially parallel to the longitudinal reactor housing axis 7. The heat transfer elements 15 are especially secured directly to the base 3 or to the lid 5. The heat transfer elements 15 have such a length that at least a section thereof is immersed into the catalyst bed. Correspondingly, heat carrier medium feed and removal orifices are provided in the base 3 or in the lid 5, which are not shown in FIGS. 1 and 3 for presentational reasons. Sufficient circulation of heat carrier medium, which is required for the requisite heat transfer, is possible via the heat carrier medium feed and removal orifices.

The flow through the heat transfer elements in the dehydrogenation reactor according to FIGS. 1 to 3 is from the lid 5 in the direction of the base 3, i.e. from the top downward. The hydrogen gas ducts 10 are open at the end face at the first end 12.

The heat transfer elements 15 are each identical. The heat transfer elements 15 have a diameter less than a diameter of the hydrogen gas ducts 10. More particularly, the diameter of the heat transfer elements 15 is not more than 50% of the diameter of the hydrogen gas duct 10, especially not more than 40% and especially not more than 30%. The heat transfer elements 15 may alternatively have a greater diameter than the diameter of the hydrogen gas ducts 10.

The hydrogen gas ducts 10 promote a suction effect for the hydrogen gas removed, and so there is better flow of the carrier medium around the heat transfer elements 15 owing to the surrounding hydrogen gas ducts 10. This flow around the heat transfer elements 15 brings about an additional improvement in heat transfer. Overall, the reactor apparatus 1 has thirty-two heat transfer elements 15. Depending on the size of the reactor housing 2, the heat transfer elements 15 and the hydrogen gas ducts 10, other numbers are also possible.

There is no catalyst disposed within the through-flow section 14. The catalyst is disposed in the region of the base 3 as a loose bed. In addition, the reactor housing 2 has been charged with a mixture 16. The mixture 16, in the working example shown, consists of the carrier medium and the catalyst. The volume of the mixture 16, in the working example shown, corresponds to about ⅔ of the volume of the reactor housing 2. A volume section within the reactor housing 2 above the first ends 12 of the hydrogen gas ducts 10 constitutes a gas collecting space 17. Within the gas collecting space 17, hydrogen gas that has escaped from the first ends 12 of the hydrogen gas ducts 10 can collect and be calmed and can flow out of the reactor apparatus 1 via the hydrogen gas orifice 6. Hydrogen gas that has escaped over the entire cross-sectional area of the reactor can also collect within the gas collecting space 17. More particularly, the gas collecting space 17 is connected directly to the hydrogen gas orifice 6 on the one hand and to the hydrogen gas ducts 10 on the other hand. The gas collecting space is a gas calming zone. The gas collecting space provides sufficient volume, especially about ⅓ of the volume, of the reactor housing 2, in order that hydrogen gas removed in the dehydrogenation can escape unhindered.

Elucidated in detail hereinafter, with reference to FIG. 3, is a plant 18 for unloading hydrogen from the carrier medium. The plant 18 comprises the reactor apparatus 1 according to FIG. 1. Laden carrier medium, especially hydrogenated LOHC, can be pumped from a first storage means 19 into the reactor housing 2 in liquid form via a feed conduit 20 and a pump 21 through the carrier medium feed orifice 9 in the base 3. Unloaded carrier medium, i.e. carrier medium separated from hydrogen, i.e. dehydrogenated LOHC, can be removed from the reactor housing 2 via the carrier medium outflow orifice 8 and an outflow conduit 22 into a second storage means 23. The feed conduit 20 and the outflow conduit 22 can be connected directly to a bypass conduit 24. In this way, it is possible to create a circular arrangement of the conduits 20, 22, 24. It is also conceivable to dispense with a corresponding circular arrangement.

By means of the arrangement of the carrier medium removal orifice 8 in the side wall 4, it is possible for the mixture 16 to run off of its own accord. The carrier medium removal orifice 8 serves to limit the charge level of the reactor housing 2. The carrier medium removal orifice 8 can be positioned at the level of the end of the catalyst bed remote from the base 3. The carrier medium removal orifice 8 can also be positioned above or below the end of the catalyst bed remote from the base 3.

A hydrogen gas duct is connected to the hydrogen gas orifice 6 in the lid 5 of the reactor housing 2, in order to send the hydrogen gas released from the reactor housing 2 to a further use. This conduit is not shown in FIG. 3.

Elucidated in detail hereinafter, with reference to FIG. 3, is the mode of function of the plant 18 comprising the reactor apparatus 1. Laden carrier medium is fed to the reactor housing 2 from the first storage means 19 via the conduit 20 and the pump 21. The carrier medium is present together with a dehydrogenation catalyst as a mixture 16. Heat is supplied to the catalyst via the heat transfer elements 15. This enables a dehydrogenation reaction, i.e. a separation of hydrogen gas from the laden carrier medium. Removed hydrogen gas can, for example, ascend upward directly in the mixture 16 and thence escape. Within the hydrogen gas ducts 10, the hydrogen gas can ascend unhindered. Removed hydrogen gas can leave the hydrogen gas duct 10 at the upper, first end 12. Removed hydrogen gas is collected in the gas collecting space 17, where it can be calmed, and it can escape via the hydrogen gas orifice 6. The carrier medium flows upward through the carrier medium feed orifice 8 in the base 3 through the mixture 16 and can be removed from the reactor housing 2 via the carrier medium removal orifice 9. Calculations by the applicant have shown that the volume-specific performance of the reactor apparatus 1 is about three times that of a horizontal shell and tube reactor with otherwise comparable kinetic boundary conditions. Moreover, the construction of the reactor apparatus 1 is particularly uncomplicated.

Described hereinafter with reference to FIG. 4 is a second working example of the invention. Parts of identical construction are given the same reference numerals as in the first working example, and reference is hereby made to the description thereof. Parts that are of different construction but have an equivalent function are given the same reference numerals followed by an "a".

The essential difference is that the reactor apparatus 1a is executed as a hydrogenation reactor. Correspondingly, the plant 18a is a plant for loading the carrier medium with hydrogen. The fundamental construction of the reactor apparatus 1a is unchanged compared to the first working example. The essential difference is that a gas inlet nozzle 25 is assigned to each hydrogen gas duct 10. The gas inlet nozzles 25 have each been introduced into the hydrogen gas ducts 10 at the first end 12. The gas inlet nozzles 25 are arranged within the hydrogen gas ducts in such a way that the gas inlet nozzles are immersed into the mixture 16. This improves the feeding of the hydrogen gas into the mixture. The gas inlet nozzles 25 are connected to one another via a gas inlet conduit 26. The gas inlet conduit 26 is guided within the reactor housing 2 and is guided out of the reactor housing 2 via the hydrogen gas orifice 6a disposed in a side wall 4. In addition, a hydrogen gas outlet orifice may be provided, in order that excess hydrogen gas can escape unhindered. In the hydrogenation reactor 1a, the hydrogen gas orifice 6a thus does not serve for removal of removed hydrogen gas, but for feeding of hydrogen gas for the planned hydrogenation of the unladen carrier medium.

For the rest, the structural make-up of the reactor apparatus is identical, except that the mode of operation is conducted in the reverse sequence as follows: unladen carrier medium from the second storage means 23 is fed via the feed conduit 20 and the pump 21 through the carrier medium feed orifice 9a in the side wall 4 of the reactor housing 2. Hydrogenated carrier medium can be fed to the first storage means 19 via the carrier medium removal orifice 8a, the removal conduit 22 and a further pump 21.

Dehydrogenated carrier medium is present in the reactor housing 2 in a mixture 16 with catalyst. Hydrogen gas which is fed into the hydrogen gas ducts 10 via the gas inlet nozzles 25 and the distributor conduit 26 serves for the hydrogenation of the carrier medium. For this purpose, the gas supplied can get to the mixture 16 in the region of the through-flow section 24.

An essential advantage of the reactor apparatus 1, 1a is considered to be that the reactor apparatus, depending on the mode of operation, i.e. more particularly depending on the fluid flows and the associated connections, one and the same reactor apparatus is usable both as hydrogenation reactor and as dehydrogenation reactor.

While specific embodiments of the invention have been shown and described in detail to illustrate the application of the principles of the invention, it will be understood that the invention may be embodied otherwise without departing from such principles.

The invention claimed is:

1. A reactor apparatus for unloading hydrogen from a carrier medium, the reactor apparatus comprising:
   a reactor housing chargeable with carrier medium and the reactor housing having a carrier medium feed orifice, a carrier medium removal orifice, a base and a hydrogen gas orifice;
   at least one heat transfer element for supplying heat into the reactor housing; and
   at least one hydrogen gas duct which is disposed in the reactor housing and extends along a longitudinal axis.

2. The reactor apparatus as claimed in claim 1, further comprising another heat transfer element to provide multiple heat transfer elements, the multiple heat transfer elements being arranged around the at least one hydrogen gas duct.

3. The reactor apparatus as claimed in claim 2, wherein the multiple heat transfer elements are arranged along a circular line around the at least one hydrogen gas duct and parallel to a longitudinal axis of the at least one hydrogen gas duct.

4. The reactor apparatus as claimed in claim 1, wherein the reactor housing is filled with catalyst.

5. The reactor apparatus as claimed in claim 4, wherein a mixture of the carrier medium and the catalyst is provided, wherein a volume of the mixture is at least half a volume of the reactor housing.

6. The reactor apparatus as claimed in claim 5, wherein a first end, remote from the base, of the at least one hydrogen gas duct is disposed outside the mixture.

7. The reactor apparatus as claimed in claim 1, wherein the at least one hydrogen gas duct has a length less than a length of the reactor housing.

8. The reactor apparatus as claimed in claim 1, wherein a through-flow section is provided at a second end, facing the base, of the at least one hydrogen gas duct.

9. The reactor apparatus as claimed in claim 1, wherein the reactor apparatus is configured as a dehydrogenation reactor.

10. The reactor apparatus as claimed in claim 9, further comprising a gas collecting space which is disposed within the reactor housing, wherein the gas collecting space is connected to the hydrogen gas orifice and to the at least one hydrogen gas duct.

11. The reactor apparatus as claimed in claim 10, further comprising a separation element which is disposed within one of the reactor housing and the gas collecting space, and the separation element is configured for separation of carrier medium out of hydrogen gas removed.

12. The reactor apparatus as claimed in claim 11, wherein the separation element comprises at least one of a condenser and a droplet separator.

13. The reactor apparatus as claimed in claim 9, wherein the carrier medium removal orifice is disposed at a side wall of the reactor housing.

14. The reactor apparatus as claimed in claim 13, wherein the carrier medium removal orifice is disposed at a level of an end of a catalyst bed remote from the base.

15. The reactor apparatus as claimed in claim 13, wherein the carrier medium removal orifice is disposed above an end of a catalyst bed remote from the base.

16. The reactor apparatus as claimed in claim 13, wherein the carrier removal orifice is disposed below an end of a catalyst bed remote from the base.

17. The reactor apparatus as claimed in claim 1, wherein the longitudinal axis is at least partially oriented vertically.

18. A plant for loading a carrier medium with hydrogen, the plant comprising:
   a reactor apparatus comprising a reactor housing chargeable with carrier medium, at least one heat transfer element for supplying heat into the reactor housing and at least one gas inlet nozzle for introducing hydrogen gas into at least one hydrogen gas duct, the reactor housing having a carrier medium feed orifice, a carrier medium removal orifice, a base and a hydrogen gas orifice, wherein the reactor apparatus is configured as a hydrogenation reactor;
   a first storage means for storing hydrogen-laden carrier medium, the first storage means being connected to the reactor apparatus;
   a second storage means for storing carrier medium separated from hydrogen, the second storage means being connected to the reactor apparatus; and
   a hydrogen gas supply connected to the reactor apparatus.

19. A reactor apparatus for loading a carrier medium with hydrogen, the reactor apparatus comprising:
   a reactor housing chargeable with carrier medium, the reactor housing having a carrier medium feed orifice, a carrier medium removal orifice, a base and a hydrogen gas orifice;
   at least one heat transfer element for supplying heat into the reactor housing; and
   at least one gas inlet nozzle for introducing hydrogen gas into at least one hydrogen gas duct, wherein the reactor apparatus is configured as a hydrogenation reactor.

20. The reactor apparatus as claimed in claim 19, wherein the at least one gas inlet nozzle is arranged with immersion into the carrier medium.

21. A plant for unloading hydrogen from a carrier medium, the plant comprising:
   a reactor apparatus comprising a reactor housing chargeable with carrier medium, at least one heat transfer element for supplying heat into the reactor housing and at least one hydrogen gas duct which is disposed in the reactor housing and extends along a longitudinal axis, the reactor housing having a carrier medium feed orifice, a carrier medium removal orifice, a base and a hydrogen gas orifice;
   a first storage means for storing hydrogen-laden carrier medium, the first storage means being connected to the reactor apparatus;
   a second storage means for storing carrier medium separated from hydrogen, the second storage means being connected to the reactor apparatus; and
   a hydrogen gas supply connected to the reactor apparatus.

* * * * *